Jan. 1, 1924. 1,479,496
W. L. CONWELL
CREAM REMOVER FOR MILK BOTTLES
Filed July 20, 1922
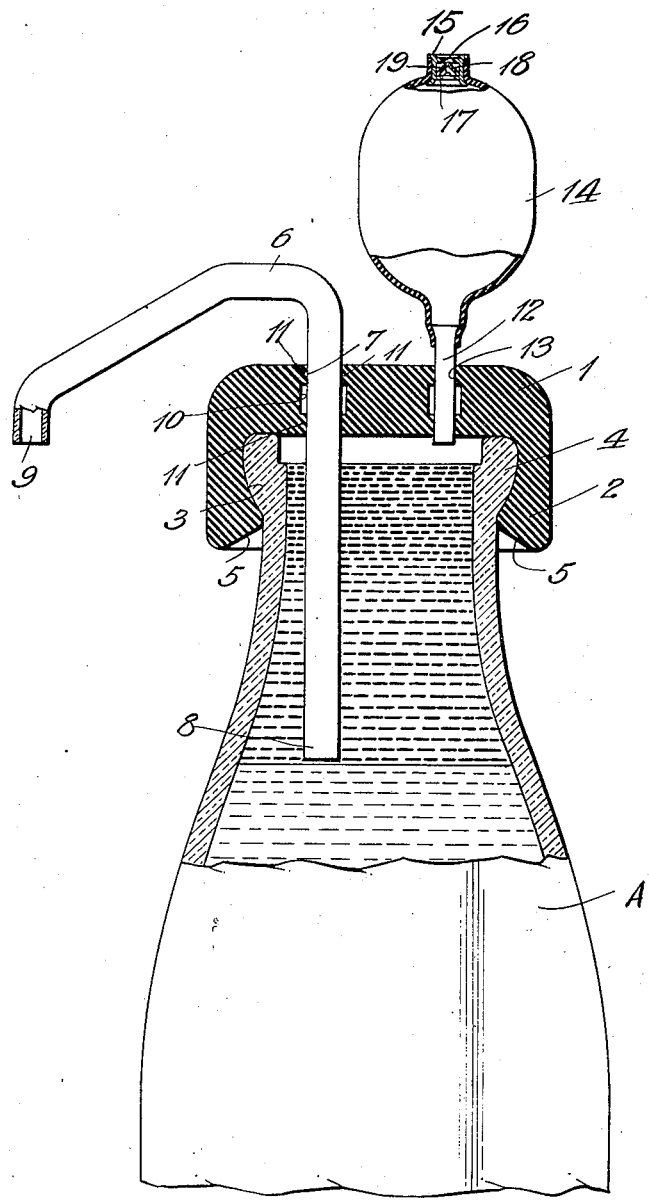
INVENTOR.
WALTER L. CONWELL
BY
Stockbridge & Borst
ATTORNEYS.

Patented Jan. 1, 1924.

1,479,496

UNITED STATES PATENT OFFICE.

WALTER L. CONWELL, OF UPPER MONTCLAIR, NEW JERSEY.

CREAM REMOVER FOR MILK BOTTLES.

Application filed July 20, 1922. Serial No. 576,233.

*To all whom it may concern:*

Be it known that I, WALTER L. CONWELL, a citizen of the United States, residing at Upper Montclair, in the county of Essex and State of New Jersey, have invented certain new and useful Improvements in Cream Removers for Milk Bottles, of which the following is a full, clear, and exact description.

This invention relates to a device for removing cream from milk bottles. The common method of accomplishing this result is to decant or pour off the cream, but this cannot be done without carrying off some of the milk also. In many of the prior mechanical devices which have been provided for removing cream, which have usually been in the nature of dippers, it has been found to be difficult, if not impossible, to remove any considerable proportion of the cream without mixing in some of the milk. An object of this invention is to provide an improved device with which practically all of the cream may be removed from a bottle of milk without mixing with it any appreciable amount of the milk; which may be quickly and easily applied to or removed from an ordinary milk bottle; which when applied to a milk bottle will be supported thereby; which is adjustable to cause the removal of the cream down to any desired level within the bottle; and which is simple in construction and use, sanitary, easily cleaned, effective, durable, and inexpensive. Other objects and advantages will be apparent from the following description of an embodiment of the invention and the novel features will be particularly pointed out in claims.

In the accompanying drawing the figure represents a portion of a milk bottle with a cream remover applied thereto which embodies the principle of this invention. In the illustrated embodiment, a cap 1 of suitable resilient material such as resilient rubber having considerable thickness, is provided with a depending annular flange 2 having an inner face 3 curved to conform to the curvature of the bead 4 at the open end of an ordinary milk bottle A, in which milk and cream are commonly delivered. When the flange 2 is placed over the neck of a bottle the cross face of the cap will extend across and in contact with the open end of the bottle and close the same. The inner diameter of the flange 2 is made slightly less than that of the section of the milk bottle with which the flange engages, so that when the cap is applied over the mouth of a milk bottle, the flange will be stretched outwardly slightly and yieldingly grip the neck of the bottle to seal the open end as well as secure the cap against displacement.

The lower edge 5 of the flange 2 is preferably beveled downwardly and outwardly so as to form a cam surface which, when the cap is applied over the neck of the bottle and pushed downwardly, will engage with the bead at the open end of the bottle and cam the flange outwardly and around the bead of the bottle. When a sufficient upward pulling force is applied to the cap the flange 2 will yield and slide over the bead, permitting removal of the cap from the bottle.

A discharge tube 6 is slidable through an aperture 7 in the face of the cap so as to project into the interior of the bottle when the cap is applied to the open end of the bottle. The aperture 7 is made slightly less in diameter than the outside diameter of the tube, so that when the tube is forced through the aperture the walls of the aperture will yield slightly and form a tight resilient contact with the surface of the tube and hold it in adjusted positions and also seal the aperture. The tube may be adjusted through the aperture in the cap to various extents so as to position its intake end 8 at different levels in the bottle, below which milk or cream will not be removed. The tube, at its outer end 9, is bent downwardly to direct the cream or milk into a suitable cup or receptacle. The wall of the aperture 7 is preferably provided with one or more recesses 10 which convert the remaining portion of the wall into resilient ribs 11 that engage the surface of the tube and form a tighter and more perfect connection therewith than would be possible if the wall of the aperture were unrecessed.

A short tube 12 passes through a second aperture 13 in the face of the cap and terminates with an open end just within the inner face of the cap. A rubber bulb 14 is applied to the outer end of the tube 12 so that when the bulb is compressed the contained air therein will be forced through the tube 12 into the chamber within the upper end of the bottle.

A metal sleeve 15 passes through a wall of the bulb and is provided with two internal flanges 16 and 17, both apertured, and the outer of which 16, serves as a valve seat. A valve in the form of a conical shell 18 is confined within the metal sleeve between the flanges with provision for a limited movement between the flanges. When the bulb is compressed, the contained air is placed under pressure and forces the shell 18 outwardly until its nose or apex engages the valve seat in the flange 16 and prevents egrees of air from the bulb. When the bulb is allowed to expand a partial vacuum is created, and the external atmospheric air pressure forces the shell 18 inwardly and away from the valve seat, the inward movement being limited by the flange 17. The base end edge of the shell is notched as at 19, at a plurality of places, through which notches the air entering through the flange 16 may pass to the interior of the bulb. This particular valve in the bulb 14 has been found to be very satisfactory in practice, but per se it forms no part of the present invention, and it is to be understood that any other suitable valve may be provided in connection with the bulb for permitting entrance of air to the interior of the bulb when the bulb is expanding, and for preventing egress of air therethrough when the bulb is compressed.

When a bottle of milk is allowed to stand for a short interval, the cream rises to the upper part of the bottle and the milk settles to the lower part of the bottle, the line of separation being sharp, and clearly visible from outside the bottle. The cap, with the parts carried thereby, is held against the exterior of the neck of the bottle at the level to which it is to be applied and the tube 6 is adjusted through the aperture in the cap until the lower intake end 8 of the tube is at the desired level, below which cream or milk is not to be removed. The usual cardboard closure of the milk bottle is then removed from the bottle and the cap with the parts carried thereby is placed over the open end of the bottle with the lower edge 5 of the flange 2 resting upon the upper edge of the neck of the bottle. The cap is then pressed downwardly, and the engagement of the beveled cam surface 5 with the bead of the bottle causes the flange to be cammed outwardly over the bead of the bottle so as to tightly grip the open end of the bottle and retain the cap with its parts securely thereon. If now the bulb 14 is compressed, the air will be forced through the tube 12 into the chamber at the upper end of the bottle, and the pressure of the air in the bottle will force the liquid above the intake end of the tube 6 through the tube and into a suitable receptacle which may be held under the discharge end 9 of the tube. The bulb may be compressed any number of times necessary to remove the desired quantity of cream or milk. When it is desired to remove the device from the bottle it is necessary merely to grasp the cap and pull the same upwardly, whereupon the flange 2 will yield and permit the removal of the cap.

The tubes 6 and 12 are preferably made of glass but may be made of metal or other suitable material. With this arrangement, it will be noted that there is no agitation of the milk or cream below the intake end of the discharge tube, and therefore if the intake end is disposed above the line of separation of the milk and cream none of the milk will be discharged with the cream. It will be noted that the only part of the device in actual contact with the milk or cream is the discharge tube, and this may be readily cleaned, either while in the cap or when removed from the same.

It will be obvious that various changes in the details and arrangements of parts herein described and illustrated for the purpose of explaining the nature of the invention may be made by those skilled in the art within the principle and scope of the invention.

I claim:

1. In a cream remover, a closure adapted to be engaged over the open end of a milk bottle to constitute a pressure closure therefor, a discharge tube passing through the cap with its intake end at approximately the line of division between the cream and milk, and a device connected to the cap for creating pressure in the bottle and thereby causing ejection through the discharge tube of a quantity of the cream in the bottle.

2. In a cream remover, a cap of rubber having a flange adapted to be passed over and tightly engage the open neck end of a milk bottle, said cap having an aperture passing through the face thereof, the walls of the aperture being recessed to form resilient annular ribs, a discharge tube passing through the aperture and engaged tightly by said ribs, said tube being adjustable through the aperture to position its intake end at the level below which cream or milk is not to be drawn, and means opening through the cap for forcing air into the upper end of the bottle and thereby causing an ejection through the discharge tube of a quantity of the cream or milk contained in the bottle.

In witness whereof, I hereunto subscribe my signature.

WALTER L. CONWELL.